United States Patent [19]

Yanagawa et al.

[11] Patent Number: 5,297,228
[45] Date of Patent: Mar. 22, 1994

[54] METHOD OF CONNECTING AN OPTICAL FIBER TO AN OPTICAL WAVEGUIDE

[75] Inventors: Hisaharu Yanagawa; Takeo Shimizu; Shiro Nakamura; Ken Ueki, all of Tokyo, Japan

[73] Assignee: The Furukawa Electric Co., Ltd., Tokyo, Japan

[21] Appl. No.: 63,005

[22] Filed: May 17, 1993

[30] Foreign Application Priority Data

May 29, 1992 [JP] Japan .................... 4-138789

[51] Int. Cl.$^5$ .............................. G02B 6/30
[52] U.S. Cl. ........................... 385/129; 385/49; 385/73; 385/83; 359/900
[58] Field of Search ............ 385/49, 63, 65, 83, 385/73, 95, 97, 98, 59, 129, 130; 359/900

[56] References Cited

U.S. PATENT DOCUMENTS

| | | | |
|---|---|---|---|
| 4,252,407 | 2/1981 | Bubanko et al. | 385/83 |
| 4,904,036 | 2/1990 | Blonder | 385/49 |
| 5,018,817 | 5/1991 | Suzuki et al. | 385/49 |
| 5,123,068 | 6/1992 | Hakoun et al. | 385/49 |

Primary Examiner—Rodney B. Bovernick
Assistant Examiner—John Ngo
Attorney, Agent, or Firm—Frishauf, Holtz, Goodman & Woodward

[57] ABSTRACT

A method of connecting an optical fiber to a planar optical waveguide is provided in which an end face of a waveguide chip in which planar optical waveguides are formed is abutted against an end face of a fiber aligning jig on which optical fibers are arranged, to thereby connect the optical fiber to the corresponding planar optical waveguide. At least one marker is formed in each of the waveguide chip and the fiber aligning jig, and also at least one pin guide groove is formed in each of the waveguide chip and the fiber aligning jig, using the marker as a reference mark. The markers of the waveguide chip and the fiber aligning jig are aligned with each other along optical axes of the planar optical waveguides when the waveguide chip and the fiber aligning jig are abutted against each other. Further, fiber guide grooves are formed in the fiber aligning jig, using the marker as a reference mark. The waveguide chip and the fiber aligning jig are abutted against each other, and the planar optical waveguide and the optical fiber are aligned with each other by means of a common guide pin laid along the corresponding pin guide grooves.

2 Claims, 6 Drawing Sheets

METHOD OF CONNECTING AN OPTICAL FIBER TO AN OPTICAL WAVEGUIDE

BACKGROUND OF THE INVENTION

1. Field of the Invention

The present invention relates to a method of connecting an optical fiber to a planar optical waveguide, and more particularly, to a connection method which permits easy, low-loss connection of an optical fiber to one of planar optical waveguides formed in an optical component.

2. Description of Related Art

When constructing an optical communication system, optical waveguide chips are used as optical components. Optical waveguide chips are generally classified into those in which silica glass is deposited on, e.g., a Si substrate whose refractive index is different from that of the silica glass, to form planar optical waveguides, and those in which semiconductor thin films of various compositions are successively formed on a special semiconductor substrate of, e.g., InGaAsP, to form planar optical waveguides.

In order for an optical waveguide chip to properly function as an optical component in an optical communication system, optical fibers are connected to the planar optical waveguides formed in the optical waveguide chip, with each axis thereof aligned with each axis of the planar optical waveguides, so that light can be transmitted from one optical fiber to the other through the planar optical waveguide.

In general, optical fibers are connected to planar optical waveguides in the following manner: First, the optical waveguide chip is positioned and fixed in a specific casing, and an optical fiber is abutted against one end of the planar optical waveguide. With light entered from the other end of the planar optical waveguide, the optical fiber is shifted relative to the planar optical waveguide, and while the optical fiber is located at a position where the intensity of light transmitted therethrough is a maximum, the fiber is firmly bonded to the planar optical waveguide by an adhesive or the like.

Subsequently, another optical fiber is connected to the other end of the planar optical waveguide in a similar manner. Namely, with light transmitted through the previously connected optical fiber, the optical fiber to be connected is positioned and bonded to the planar optical waveguide.

In the connection method described above, there is employed no particular mechanical member which keeps each axis of optical fiber aligned with each axis of the planar optical waveguides formed in an optical waveguide chip, for preventing unwanted movement after axis alignment procedures. Thus, the connection reliability is low, possibly causing an increase of the connection loss, when the connection is subject to temperature variation or external stress.

Further, the above connection method requires considerable time for the abutting of the optical fiber onto the planar optical waveguide, preparations for the transmission of light to the optical fibers, preparations for the measurement of the intensity of output light, etc. In addition, expensive apparatuses are needed for the positioning of the optical fibers and the optical waveguide chip.

SUMMARY OF THE INVENTION

The present invention was created to solve the above problems, and an object thereof is to provide a method of connecting an optical fiber to a planar optical waveguide, by which high-reliability connection can be easily carried out in short time.

To achieve the above object, the present invention provides a method of connecting an optical fiber to a planar optical waveguide, in which an end face of a waveguide chip in which planar optical waveguides are formed is abutted against an end face of a fiber aligning jig on which optical fibers are arranged, to thereby connect the optical fiber to the corresponding planar optical waveguide, the method comprising: forming at least one marker in each of the waveguide chip and the fiber aligning jig, and at least one pin guide groove in each of the waveguide chip and the fiber aligning jig by using the marker as a reference mark, the markers of the waveguide chip and the fiber aligning jig being aligned with each other along optical axes of the planar optical waveguides when the waveguide chip and the fiber aligning jig are abutted against each other, and forming fiber guide grooves in the fiber aligning jig by using the marker as a reference mark; and abutting the waveguide chip and the fiber aligning jig against each other, and aligning the planar optical waveguide and the optical fiber with each other by means of a common guide pin laid along the corresponding pin guide grooves.

Specifically, a method of connecting an optical fiber to a planar optical waveguide according to the present invention comprises the steps of: cutting a marker in a surface of a substrate in a longitudinal direction of planar optical waveguides to be formed; forming a lower cladding, planar optical waveguides and an upper cladding on the surface of the substrate to obtain a waveguide body; cutting a pin guide groove in a surface of the upper cladding in a longitudinal direction of the marker, by using the marker as a reference mark; cutting the waveguide body in a width direction of the planar optical waveguides to obtain a central chip and two opposite end chips; cutting a fiber guide groove in the surface of the upper cladding of each of the end chips in the longitudinal direction of the marker, by using the marker as a reference mark, so that each end chip serves as a fiber aligning jig; and abutting cut end faces of the fiber aligning jigs onto opposite cut end faces of the central chip, respectively, with an optical fiber placed in each of the fiber guide grooves and a guide pin laid along the pin guide grooves formed in the central chip and the end chips, aligning the planar optical waveguide and the optical fibers with each other, and bonding the chips in one piece.

When the fiber aligning jigs are abutted against the waveguide chip at their end faces, the markers in the individual components are aligned and extend along the optical axis. Also, the pin guide grooves in the waveguide chip and the aligning jigs are aligned and form an apparently single groove, because the pin guide grooves are cut as a single groove, using the marker as a reference mark, before the waveguide body is cut into three parts, i.e., the waveguide chip and the two aligning jigs. The fiber guide groove is formed in each aligning jig, also using the marker as a reference mark, and thus, when the aligning jigs are abutted against the waveguide chip, optical fibers placed in the respective fiber guide grooves are accurately positioned with respect to each planar optical waveguide formed in the waveguide chip, with their optical axes aligned with each other.

Accordingly, the aligning jigs are abutted against the waveguide chip with the guide pin laid along the pin guide grooves across the waveguide chip and the aligning jigs, and thus the waveguide chip and the aligning jigs are never displaced relative to each other. According to the method of the present invention, therefore, the planar optical waveguides and optical fibers can be fixed while being automatically aligned with each other, whereby the connection can be carried out very easily in short time and the connection loss is reduced.

The above and other objects, features, and advantages of the present invention will become apparent from the following description when taken in conjunction with the accompanying drawings.

DETAILED DESCRIPTION OF THE PREFERRED EMBODIMENT

An embodiment of the present invention will be described in detail with reference to the accompanying drawings.

Figure 1:
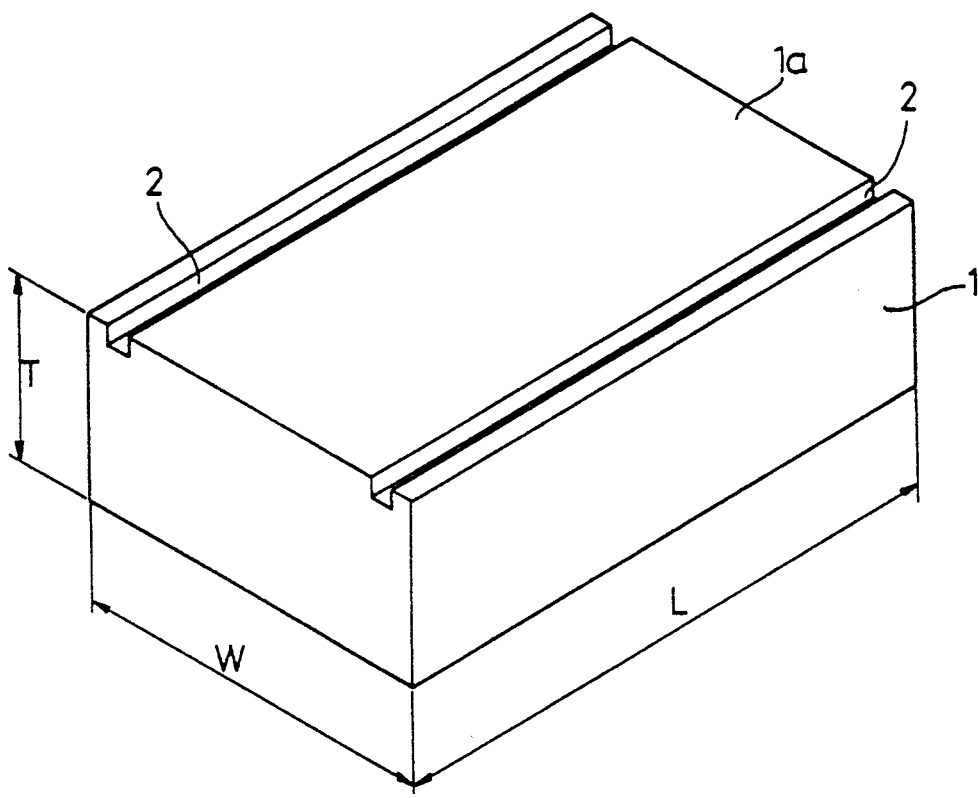
FIG. 1 is a perspective view of a substrate in which markers were cut.

In the present invention, first, a Si substrate 1 having a length L of 30 mm, a width W of 10 mm, and a thickness T of 1 mm, for example, is prepared as shown in FIG. 1. A marker groove 2 of 10 $\mu$m wide and 10 $\mu$m deep, for example, extending along the optical axes of planar optical waveguides to be formed, is cut on each side of a surface 1a of the substrate 1. Usually, the marker grooves 2 are cut by using a dicing saw.

First of all the cutting of the marker grooves 2 in the surface of the Si substrate 1 is carried out in order to facilitate visual confirmation of the positions of the marker grooves 2, because Si has metallic luster, and thereby to permit pin guide grooves and fiber guide grooves to be cut with high accuracy in the subsequent steps.

Figure 2:
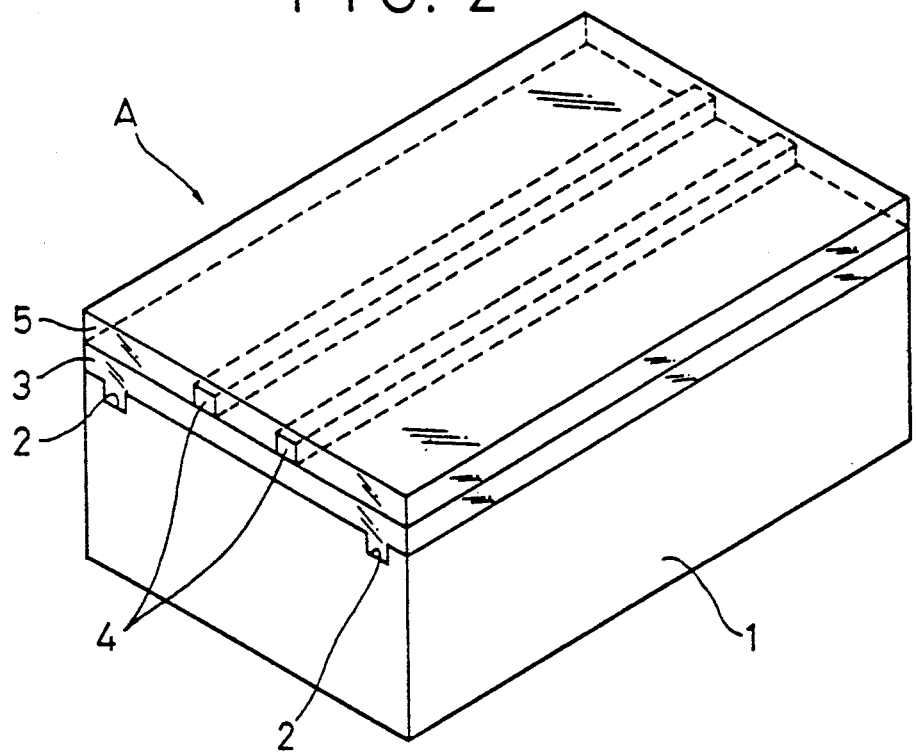
FIG. 2 is a perspective view of a waveguide body obtained by forming a lower cladding, planar optical waveguides, and an upper cladding on the substrate.

Next, using a conventional flame hydrolysis deposition method, a conventional photolithographical method and a conventional dry etching method, a lower cladding 3 of silica glass having a thickness of, e.g., 20 $\mu$m, two channel optical waveguides 4, and an upper cladding 5 of, e.g., 20 $\mu$m thick are successively formed on the surface of the substrate 1, such that the marker grooves 2 are filled up with the lower cladding 3 as shown in FIG. 2, thereby obtaining a waveguide body A.

In the photolithographical process for forming the channel optical waveguides 4, photomask alignment is carried out with a submicron accuracy, using the marker grooves 2 as positioning reference.

In this case, for the matching with the standard single mode of optical fibers to be connected, each of the channel optical waveguides 4 has a square cross section of, e.g., 8 $\mu$m by 8 $\mu$m, and has a difference in specific refraction index, $\Delta$, of 0.3%.

Figure 3:
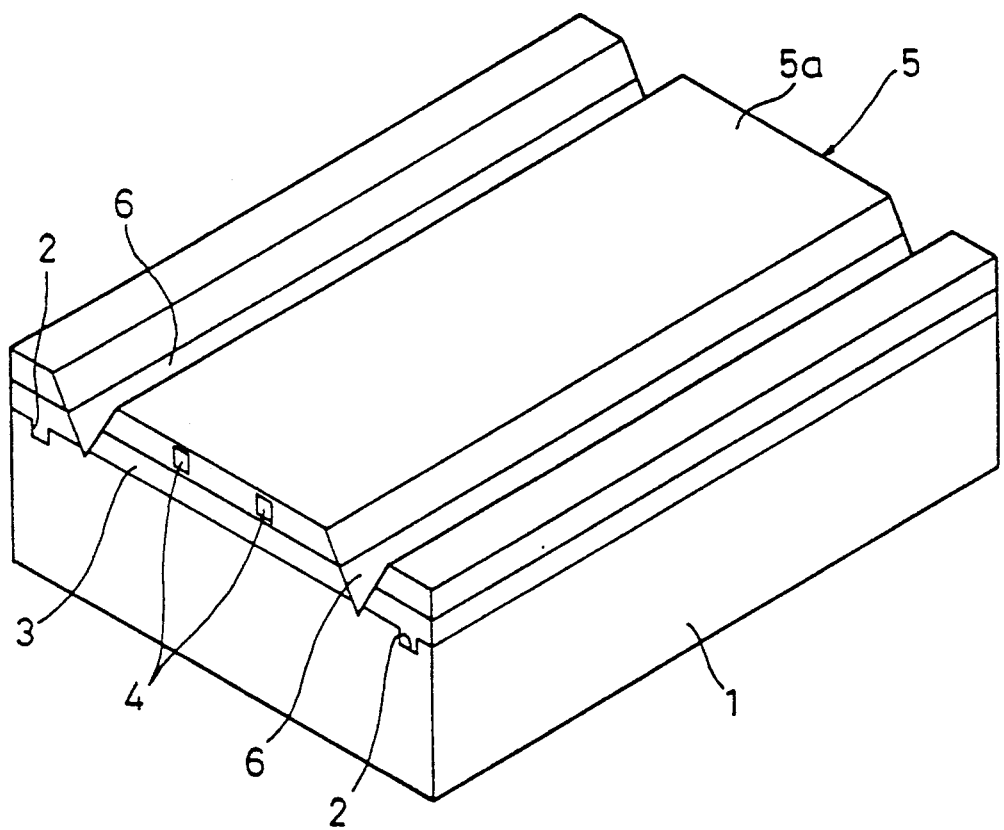
FIG. 3 is perspective view of the waveguide body of FIG. 2 in which pin guide grooves were cut.

Subsequently, using the marker grooves 2 formed in the substrate 1 as reference marks, two V-grooves, for example, which extend along the optical axes of the optical waveguides 4, are cut in a surface 5a of the upper cladding 5 by slicing, as shown in FIG. 3, thereby making pin guide grooves 6.

The pin guide grooves 6 are made after the formation of the upper cladding 5 for the following reason: When the upper cladding 5 of silica glass is formed by the flame hydrolysis deposition method, silica glass is deposited on surface and forms a fine particle layer, and this glass particle layer shrinks after the formation of the upper cladding 5. Thus, after the glass layer shrinks uniformly over the entire surface of the upper cladding (which forms the upper cladding of each of a central chip and opposite two end chips as described later), the pin guide grooves 6 are formed, thereby stabilizing the dimensional accuracy thereof.

Figure 4:
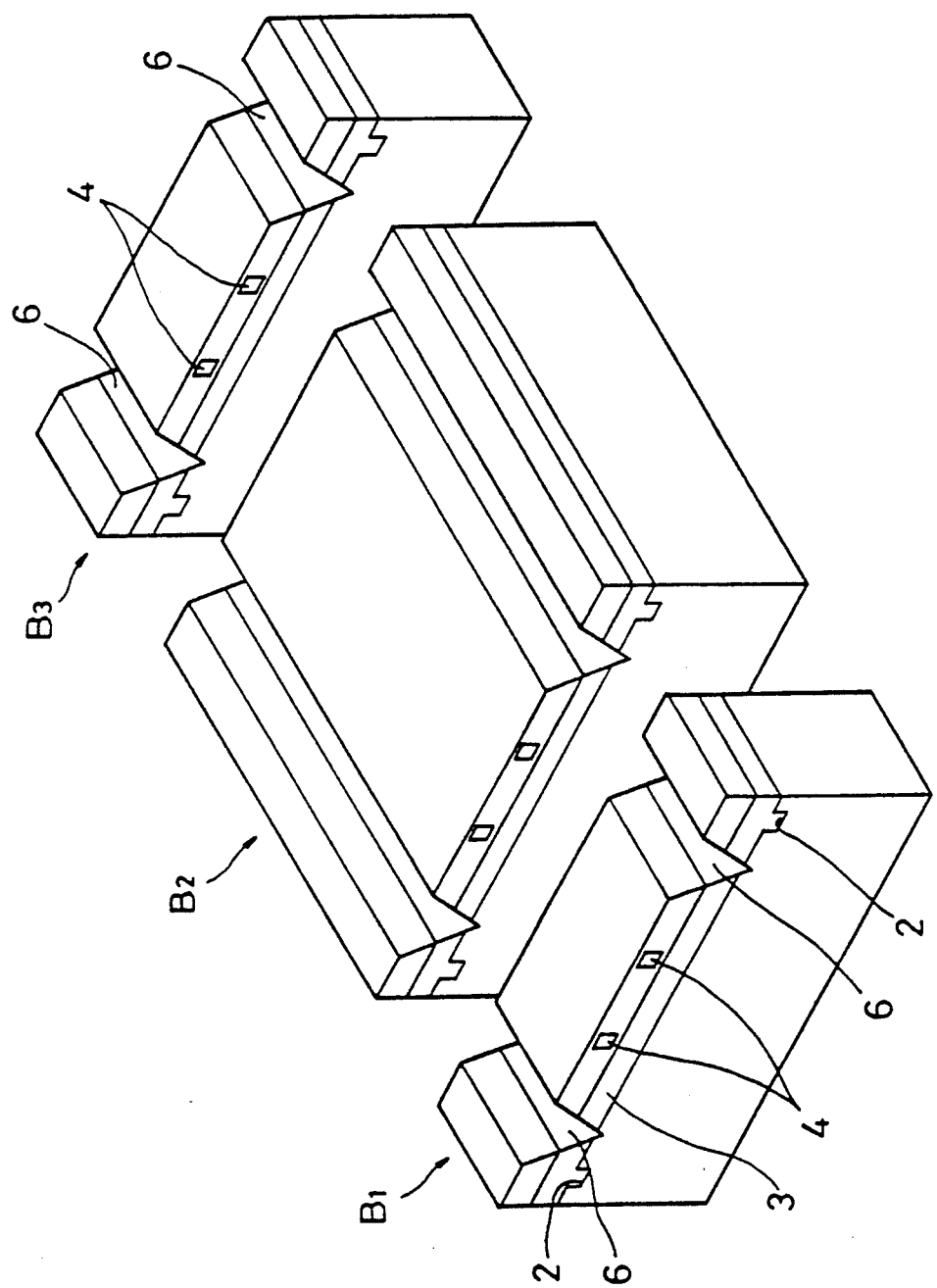
FIG. 4 is a perspective view of three chips obtained by cutting the waveguide body of FIG. 3 in a width direction thereof into three parts.

Next, the waveguide body A with the pin guide grooves 6 formed therein is cut in a direction perpendicular to the optical axes of the waveguides 4, to obtain two end chips $B_1$ and $B_3$ and a central chip $B_2$, as shown in FIG. 4. Thus, when the chips $B_1$, $B_2$ and $B_3$ are butted at their cut end faces, the marker grooves 2, the channel optical waveguides 4, and the pin guide grooves 6 of these chips are respectively aligned along the optical axes, forming two straight marker grooves, two straight waveguides, and two straight pin guide grooves as before the waveguide body A is cut.

Figure 5:
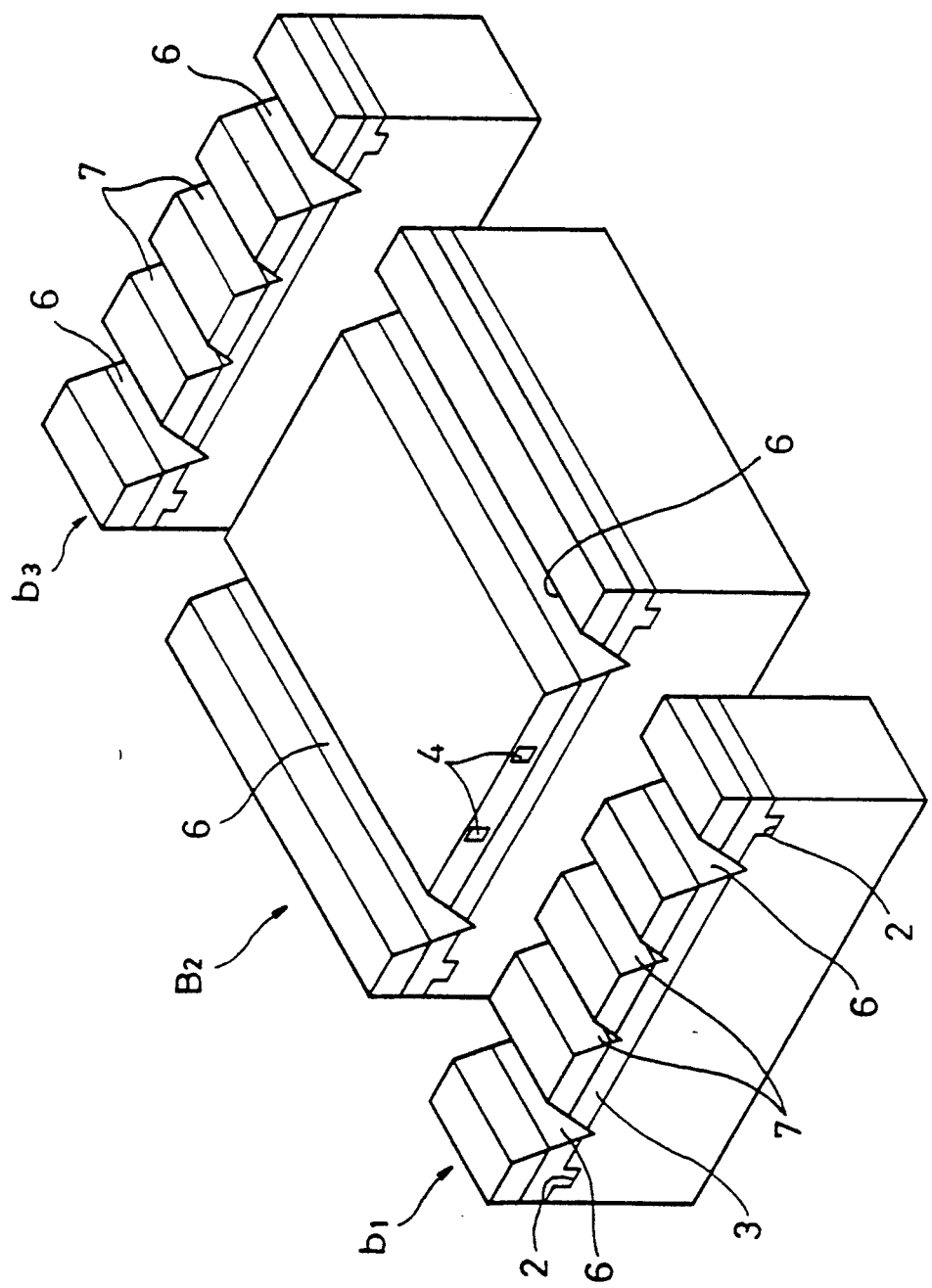
FIG. 5 is a perspective view of the three chips of FIG. 4 in which fiber guide grooves were cut in the opposite end chips to obtain fiber aligning jigs.

Then, using the marker grooves 2 as reference marks, two V-grooves 7 are cut in the upper surface of each of the end chips $B_1$ and $B_3$ by slicing, corresponding in position to their channel optical waveguides 4, respectively, thus making fiber guide grooves 7. These end chips $B_1$ and $B_3$ are used as fiber aligning jigs $b_1$ and $b_3$ (FIG. 5). The fiber guide grooves 7 should have a cross sectional shape such that, when optical fibers are placed therein, the fibers are aligned with the corresponding waveguides 4 of the central chip $B_2$.

Subsequently, the fiber aligning jigs $b_1$ and $b_3$ are abutted onto the opposite end faces of the central chip (waveguide chip) $B_2$, whereby the two pin guide grooves 6 of the individual chips are aligned along the optical axes of the waveguides 4.

Figure 6:
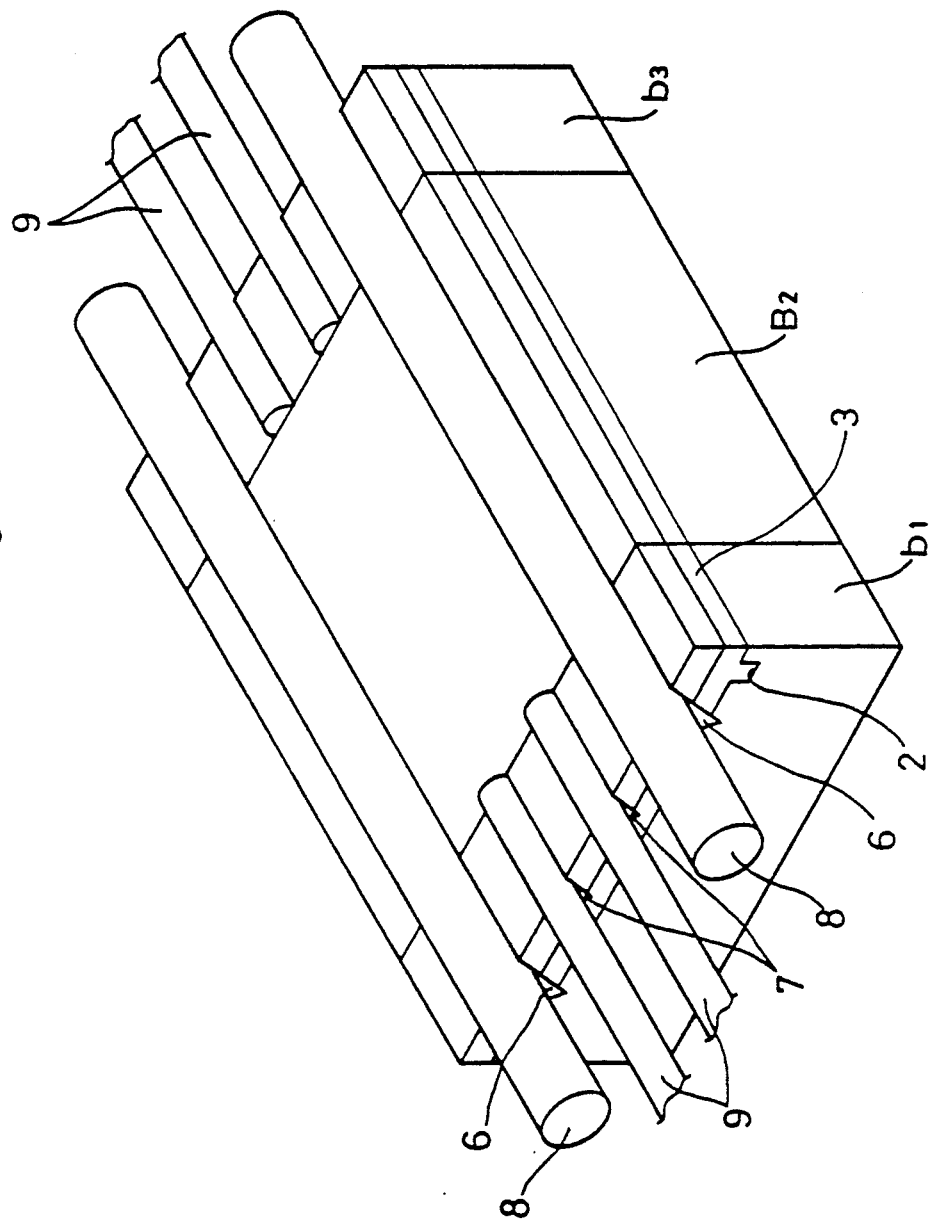
FIG. 6 is a perspective view showing a state in which optical fibers were connected to the planar optical waveguides.

Then, a guide pin 8 is laid in each of the V-grooves (pin guide grooves) 6 so as to extend across the central chip $B_2$ and the fiber aligning jigs $b_1$ and $b_3$, and two optical fibers 9 to be connected to the respective channel optical waveguides 4 of the central chip $B_2$ are placed respectively in the two fiber guide grooves 7 of each of the fiber aligning jigs $b_1$ and $b_3$ (FIG. 6).

Figure 7:
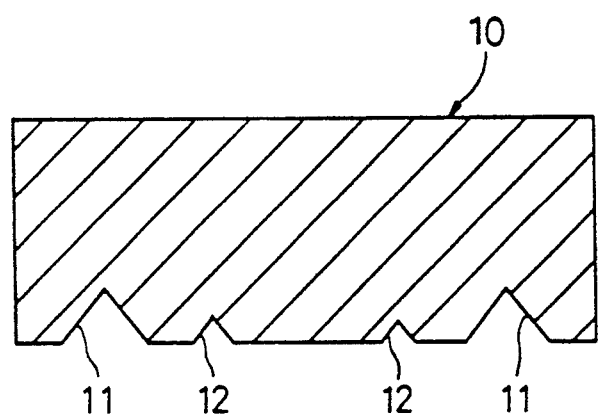
FIG. 7 is a sectional view of a cover which is used when optical fibers are connected to the waveguides as shown in FIG. 6.

Next, a cover 10, which has the similar cross sectional shape as the fiber aligning jigs $b_1$ and $b_3$ and has pin guide grooves 11 and fiber guide grooves 12 formed therein corresponding in position to the pin guide grooves 6 and the fiber guide grooves 7, respectively, as shown in FIG. 7, is placed on the butted structure ($b_1$, $B_2$, $b_3$), whereby the structure ($b_1$, $B_2$, $b_3$) and the cover 10 urgingly hold the guide pins 8 and the optical fibers 9 therebetween.

Consequently, the central chip $B_2$ and the fiber aligning jigs $b_1$ and $b_3$ are fixed in position and prevented from being displaced in the transverse direction relative to each other by the guide pins 8 laid along the respective V-grooves (pin guide grooves) 6, and also the optical fibers 9 placed in the respective fiber guide grooves 7 of the fiber aligning jigs $b_1$ and $b_3$ are fixed in position and aligned with the corresponding channel optical waveguides 4 of the central chip $B_2$.

While in this state, the central chip (waveguide chip) $B_2$ and the fiber aligning jigs $b_1$ and $b_3$ are bonded at their butted end faces by an optical adhesive, thereby completing the connection of the optical fibers 9 to the associated channel optical waveguides 4.

In the above-described embodiment, since silica glass layers having a total thickness of about 40 μm are formed on the surface of the 1 mm-thick Si substrate by the flame hydrolysis deposition method, the silica glass layers are subject to warp having a curvature of the order of meters. Thus, when each channel optical waveguide 4 is connected to the corresponding optical fibers 9, the channel optical waveguide 4 and the optical fibers 9 are actually situated along an arc curved with respect to a horizontal plane. However, since each waveguide 4 and the associated optical fibers 9 extend along the same arc, misalignment of the optical axes does not occur.

In the foregoing embodiment is described a method of connecting optical fibers to a single waveguide chip, but the present invention is not limited to such application alone. For example, the method according to the present invention can be applied collectively to a plurality of waveguide chips formed on a single wafer.

Further, unlike the above-described steps of process, after the waveguide body A shown in FIG. 2 is cut in the width direction to obtain three chips as shown in FIG. 5, pin guide grooves 6 may be cut in each of the chips, using the marker grooves 2 as reference marks. Then, fiber guide grooves 7 are formed in each of the end chips, also using the marker grooves 2 as reference marks.

Alternatively, the substrate 1 formed with the marker grooves 2 alone, shown in FIG. 1, may be first cut in the width direction to obtain three chips. In this case, a silica glass layer composed of a lower cladding 3, channel optical waveguides 4, and an upper cladding 5 is formed on the central chip by the flame hydrolysis deposition method, while such a glass layer deposition is not done on the end chips, and then pin guide grooves 6 are formed separately in the individual chips, using the marker grooves 2 as reference marks.

In such case, since the silica glass layer is subject to a shrinkage of approximately 0.01%, the distance between the pin guide grooves 6 formed in each end chip serving as the fiber aligning jig must be smaller by about 0.01% than that between the pin guide grooves 6 formed in the central chip serving as the waveguide chip.

Furthermore, after a silica glass layer is formed on a surface of a substrate 1 having no marker grooves formed therein and at least a core channel is formed as a planar optical waveguide, marker grooves 2 may be cut with a predetermined relative position to the core channel. The marker grooves 2 are used thereafter as reference marks when forming pin guide grooves 6.

What is claimed is:

1. A method of connecting an optical fiber to a planar optical waveguide, in which an end face of a waveguide chip in which planar optical waveguides are formed is abutted against an end face of a fiber aligning jig on which optical fibers are arranged, to thereby connect the optical fiber to the corresponding planar optical waveguide, the method comprising:

forming at least one marker in each of the waveguide chip and the fiber aligning jig, and at least one pin guide groove in each of the waveguide chip and the fiber aligning jig by using the marker as a reference mark, the markers of the waveguide chip and the fiber aligning jig being aligned with each other along optical axes of the planar optical waveguides when the waveguide chip and the fiber aligning jig are abutted against each other, and forming fiber guide grooves in the fiber aligning jig by using the marker as a reference mark; and abutting the waveguide chip and the fiber aligning jig against each other, and aligning the planar optical waveguide and the optical fiber with each other by means of a common guide pin laid along the corresponding pin guide grooves.

2. A method of connecting an optical fiber to a planar optical waveguide, comprising the steps of:

cutting a marker in a surface of a substrate in a longitudinal direction of planar optical waveguides to be formed;

forming a lower cladding, planar optical waveguides and an upper cladding on the surface of the substrate to obtain a waveguide body;

cutting a pin guide groove in a surface of the upper cladding in a longitudinal direction of the marker, by using the marker as a reference mark;

cutting the waveguide body in a width direction of the planar optical waveguides to obtain a central chip and two opposite end chips;

cutting a fiber guide groove in the surface of the upper cladding of each of the end chips in the longitudinal direction of the marker, by using the marker as a reference mark, so that each end chip serves as a fiber aligning jig; and abutting cut end faces of the fiber aligning jigs onto opposite cut end faces of the central chip, respectively, with an optical fiber placed in each of the fiber guide grooves and a guide pin laid along the pin guide grooves formed in the central chip and the end chips, aligning the planar optical waveguide and the optical fibers with each other, and bonding the chips in one piece.

* * * * *